United States Patent
Acharya et al.

(10) Patent No.: US 9,909,940 B2
(45) Date of Patent: Mar. 6, 2018

(54) SYSTEM AND METHOD FOR NON-INVASIVE GENERATOR DAMPING TORQUE ESTIMATION

(71) Applicant: General Electric Company, Schenectady, NY (US)

(72) Inventors: Naresh Acharya, Schenectady, NY (US); Nilanjan Ray Chaudhuri, Fargo, ND (US); Chaitanya Ashok Baone, Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 361 days.

(21) Appl. No.: 14/697,284

(22) Filed: Apr. 27, 2015

(65) Prior Publication Data

US 2016/0313197 A1    Oct. 27, 2016

(51) Int. Cl.
*G01L 3/00* (2006.01)
*H02J 3/24* (2006.01)
(Continued)

(52) U.S. Cl.
CPC .............. *G01L 3/00* (2013.01); *H02J 3/24* (2013.01); *H02P 9/105* (2013.01);
(Continued)

(58) Field of Classification Search
CPC ... G01L 3/00; G01L 3/02; G01L 3/045; G01L 3/10; G01L 3/101; G01L 3/24;
(Continued)

(56) References Cited

U.S. PATENT DOCUMENTS

| 6,476,521 | B1 | 11/2002 | Loef et al. |
| 8,686,580 | B2 | 4/2014 | Hearns et al. |

(Continued)

FOREIGN PATENT DOCUMENTS

| CN | 100486073 C | 5/2009 |
| CN | 101566648 | 10/2009 |
| CN | 103050992 A | 4/2013 |

OTHER PUBLICATIONS

Chaudhuri et al., Impact of Wind Penetration and HVDC Upgrades on Dynamic Performance of Future Grids, 2011 IEEE, 8 pp.*

(Continued)

*Primary Examiner* — Toan Le
(74) *Attorney, Agent, or Firm* — Nitin N. Joshi

(57) ABSTRACT

A stability analysis system (SAS) for non-invasive estimation of damping torque associated with a power generator in an electric power network includes a processor in communication with a PMU associated with the generator. The processor is configured to receive a first data sample set from the PMU. The first data set is substantially representative of at least one measurement of the generator. The processor is also configured to determine an estimated torque of the generator based at least in part on the first data set. The processor is further configured to determine an estimated average torque and one or more estimated torque components based at least in part on the estimated torque. The processor is also configured to output the estimated average torque and the one or more estimated torque components to an operator for use in stability analysis of one or more of the generator and the network.

21 Claims, 9 Drawing Sheets

(51) Int. Cl.
*H02P 9/10* (2006.01)
*H02J 3/00* (2006.01)

(52) U.S. Cl.
CPC ....... *H02J 2003/007* (2013.01); *Y02E 60/728* (2013.01); *Y02E 60/76* (2013.01); *Y04S 10/265* (2013.01); *Y04S 40/22* (2013.01)

(58) Field of Classification Search
CPC ....... G01L 3/242; H02J 3/24; H02J 2003/007; H02J 2003/365; H02P 9/105; Y04S 10/265; Y02E 60/728
See application file for complete search history.

(56) References Cited

U.S. PATENT DOCUMENTS

| | | |
|---|---|---|
| 2012/0082048 A1 | 4/2012 | Taft et al. |
| 2013/0338841 A1 | 12/2013 | Scholtz et al. |
| 2014/0148962 A1 | 5/2014 | Venayagamoorthy |

OTHER PUBLICATIONS

Feilat et al., "Estimating the synchronizing and damping torque coefficients using Kalman filtering", Electric Power Systems Research Elsevier Switzerland, Nov. 1999, pp. 145-149, vol. No. 52, Issue No. 2.

European Search Report issued in connection with Corresponding EP Application No. 16166313.3 dated Jul. 14, 2016.

Shaltout et al.,"Analysis of Damping and Synchronizing Torques Part II—Effect of Operating Conditions and Machine Parameters", Power Apparatus and Systems, IEEE Transactions on, vol. PAS-98,Issue 5,pp. 1701-1708, Sep. 1979.

Alden et al., "Analysis of Damping and Synchronizing Torques Part I—A General Calculation Method", Power Apparatus and Systems, IEEE Transactions on, vol. 98 , Issue 5, pp. 1696-1700, Sep. 1979.

Matsuki et al.,"On-line calculation of synchronizing and damping torque coefficients of a synchronous generator", Electrical Machines and Drives, 1991. Fifth International Conference on (Conf. Publ. No. 341), pp. 316-320, Sep. 1991.

Shaltout et al., "Damping and synchronous torque computation in multimachine power systems," IEEE Trans. Power Systems, vol. 7, issue 1, pp. 280-286, Feb. 1992.

Feilat et al.,"On-line adaptive assessment of the synchronizing and damping torque coefficients using Kalman filtering", Southeastcon '99. Proceedings. IEEE, pp. 145-148, Mar. 1999.

Ghasemi et al., "Damping torque estimation and oscillatory stability margin prediction", Power Engineering Society General Meeting, 2006. IEEE.

Ghasemi et al.,"On-Line Damping Torque Estimation and Oscillatory Stability Margin Prediction", Power Systems, IEEE Transactions on, vol. 22 , Issue 2, pp. 667-674, May 2007.

Bi et al., "Dynamic state estimator with Phasor measurements for power system electromechanical transient process", Power & Energy Society General Meeting, 2009. PES '09. IEEE, pp. 1-5, Jul. 2009.

Ge et al., "Co-ordinated design of phase measurement unit and power system stabilizers in large scale power systems", Renewable Power Generation Conference (RPG 2013), 2nd IET, pp. 1-5, Sep. 2013.

Chen et al., "A Novel Approach for Dynamic State Estimation with Synchrophasor Measurements", Security in Critical Infrastructures Today, Proceedings of International ETG-Congress 2013; Symposium 1, pp. 1-6, Nov. 2013.

C.W. Taylor, D.C. Erickson, K.E. Martin, R.E. Wilson, V. Venkatasubramanian, "WACSWide-Area Stability and Voltage Control System: R&D and Online Demonstration," Proceedings of the IEEE, vol. 93, No. 5, pp. 892-906, May 2005.

\* cited by examiner

SYSTEM AND METHOD FOR NON-INVASIVE GENERATOR DAMPING TORQUE ESTIMATION

BACKGROUND

The present disclosure relates generally to power generation and stability within a power grid and, more specifically, to systems and methods for non-invasive estimation of damping torque for power generators in the power grid.

Some known power systems analyze system stability based on a static view of the system, which may not consider the electro-mechanical interactions among generators, loads, and control devices. With widespread deployment of renewable generation (e.g., solar and wind generators), controllable loads, energy storage devices, and plug-in hybrid electric vehicles expected, greater integration of cyber infrastructure (e.g., communications, computation, and control), monitoring, and controlling th dynamic performance of the power grid in real-time becomes increasingly important.

When analyzing power systems, power system states (e.g., variables) may be classified into two classes, i.e., static states and dynamic states. Static states include various bus voltage magnitudes and phase angles. These measurements may change slowly over a period of time. However, the variations will be small and short-lived. In some known systems, these static state variables have been estimated using a state estimator (SE) utilizing telemetered data from a supervisory control and data acquisition (SCADA) system. Dynamic states include generator rotor speeds and rotor angles, internal differential variables associated with generators, exciters, power system stabilizers, turbine governors, wind generation systems, and other dynamic components in the system (e.g., motor loads). While both of these classes of states vary continuously over time, the dynamic states are the primary variable class which governs the transient response of the system. In many instances, there may be no direct measurement of these dynamic states available from the grid.

Most modern power systems include a number of electric power generating devices substantially synchronized to each other when in service. Each generator has at least some slight differences in physical configuration and operational performance characteristics and constraints, therefore each generator will deviate slightly from the other connected generators with respect to loading. Since the total load on the power system will vary with time continuously as loads are added and removed, each synchronous generator will react to the changes differently. While equilibrium between the electromagnetic and mechanical torques of the generators is substantially maintained, small perturbations in the loading of the power system will initiate shifts of the balance between power demand and power availability in the power system for short periods of time as the synchronized generators adjust to these changes based on their structural and operational configurations and limitations. The change in electromagnetic torque of each synchronous generator following a perturbation is resolved into two components, i.e., a synchronizing torque component in phase with the rotor angle deviation, and a damping torque component in phase with the angular speed deviation. Lack of sufficient synchronizing torque is associated with non-oscillatory instabilities and lack of damping torque results in low frequency oscillations.

A growing challenge inherent in grid integration of more diverse sources of power generation is that of characterizing individual generators' contributions to higher-level, system-wide objectives such as grid stability. Some known stability analysis tools address damping of oscillations through defining the damping torque associated with each generator. However, damping torque estimations using peripheral measurements, such as through voltage and current samples provided by phasor measurement units (PMU's) have traditionally been purely a conceptual tool, with limited success. Therefore, to perform damping torque evaluations of individual generators, the generators must undergo invasive testing, that is, either the generators must be taken out of service for the duration of the testing and analysis or be subject to artificial disturbances while in service. Such invasive testing, however, does not provide for estimating the damping torque contributions from each generator in real-time across different operating conditions.

BRIEF DESCRIPTION

In one aspect, a stability analysis system (SAS) for non-invasive estimation of damping torque associated with a power generator in an electric power network is provided. The SAS includes a processor in communication with a phasor measurement unit (PMU) associated with the power generator. The processor is configured to receive a first data sample set from the PMU. The first data sample set is substantially representative of at least one measurement of the power generator. The processor is also configured to determine an estimated torque of the power generator based at least in part on the first data sample set. The processor is further configured to determine an estimated average torque and one or more estimated torque components based at least in part on the estimated torque. The processor is also configured to output the estimated average torque and the one or more estimated torque components to an operator for use in stability analysis of one or more of the power generator and the electric power network.

In a further aspect, a computer-based method for non-invasive estimation of damping torque associated with a power generator in a power network is provided. The method uses a computing device including at least one processor in communication with a phasor measurement unit (PMU) associated with the power generator. The method includes receiving a first data sample set from the PMU. The first data sample set is substantially representative of at least one measurement of the power generator. The method also includes determining an estimated torque of the power generator based at least in part on the first data sample set. The method further includes determining an estimated average torque and one or more estimated torque components based at least in part on the estimated torque. The method also includes outputting the estimated average torque and the one or more estimated torque components to an operator for use in stability analysis of one or more of the power generator and the power network.

In another aspect, at least one non-transitory computer-readable storage media having computer-executable instructions embodied thereon is provided. When executed by at least one processor, the computer-executable instructions cause the processor to receive a first data sample set from a phasor measurement unit (PMU) in communication with the processor and associated with a power generator in a power network. The first data sample set is substantially representative of at least one measurement of the power generator. Also, when executed by at least one processor, the computer-executable instructions cause the processor to determine an estimated torque of the power generator based at least in part on the first data sample set. Further, when executed by at least one processor, the computer-executable instructions cause the processor to determine an estimated average torque and one or more estimated torque components based at least in part on the estimated torque. Moreover, when executed by at least one processor, the computer-executable instructions cause the processor to output the estimated average torque and the one or more estimated torque components to an operator for use in stability analysis of one or more of the power generator and the power network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
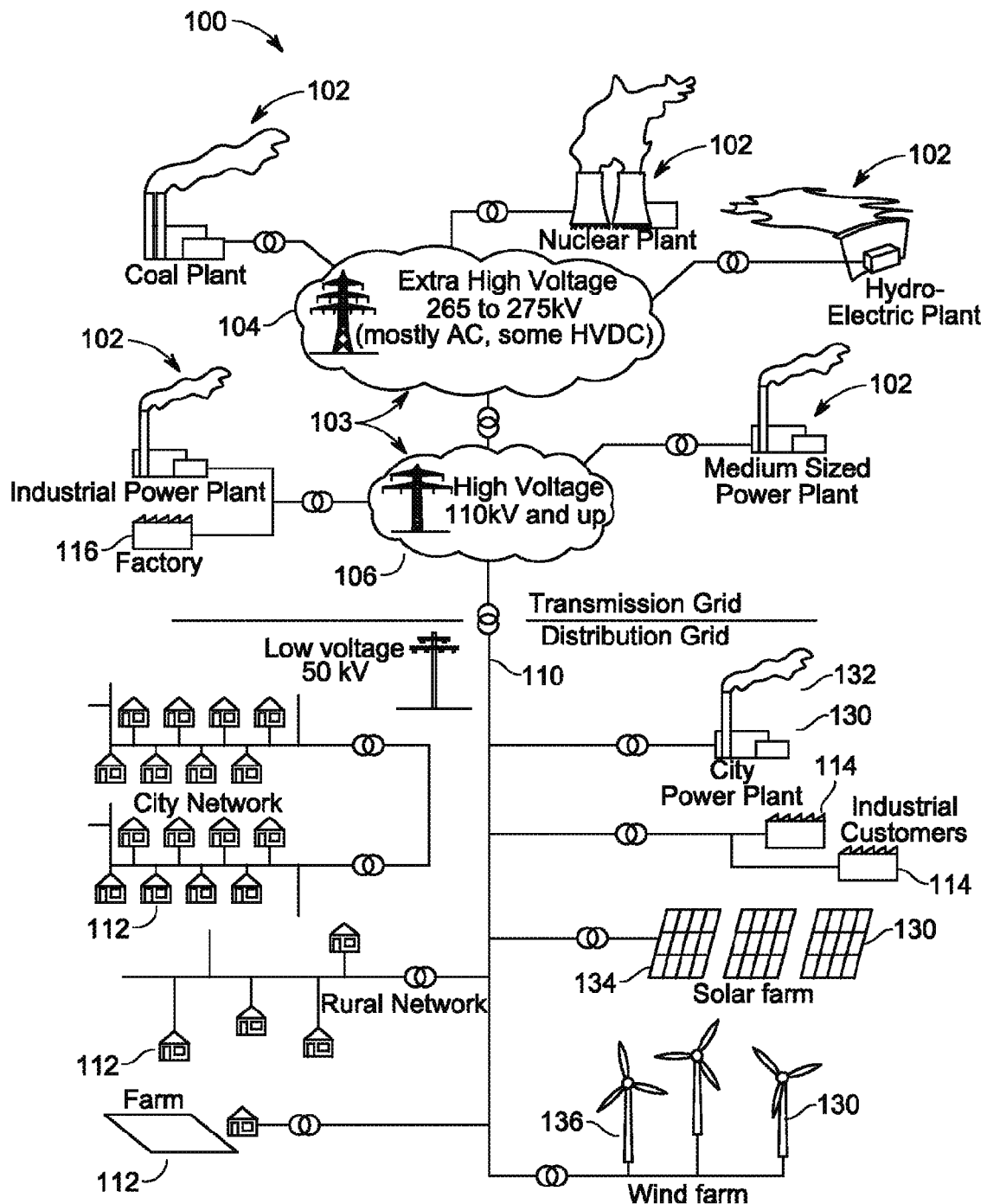
FIG. 1 is a general schematic diagram of both an exemplary transmission network and an exemplary electrical power distribution system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "operator" includes any person in any capacity associated with operating and maintaining electric distribution system, including, without limitation, users of the systems described herein, shift operations personnel, maintenance technicians, and system supervisors.

As used herein, the term "data stream" is used generally to refer to an ordered series of data values that, for example, are collected from one device and sent to another device across a communications network. More specifically, in some embodiments, a phasor measurement unit (PMU) captures data values, such as current and voltage levels, from a particular point in an electric power transmission network. In some embodiments, these values are collected at a frequency of 60 times per second, i.e., one value collected every $\frac{1}{60}^{th}$ second. The PMU continuously sends this series of collected values as a "data stream" to another computing device, such as a phasor data concentrator (PDC) and/or a stability analysis system (SAS), for further processing.

As used herein, the term "stability analysis" is used to refer to an analysis of real-time data recorded through at least one phasor measurement unit (PMU) to estimate the dynamic states of an individual electric power generator and enable practical estimation of damping torque for the respective generator in real-time with respect to each individual mode of frequency oscillation.

As used herein, the term "mode" is used to refer to an electromechanical mode of low frequency oscillations in an electric power system. Each oscillatory mode is defined by the associated modal angular frequency, damping, and shape of the oscillation throughout the power system. The mode shape defines the amplitude and phasing of the oscillation throughout the system and effective oscillation damping relies, at least in part, on effective identification of the electromechanical modal properties of the power system.

The methods and systems described herein include analyzing streams of data sent from phasor measurement units (PMU's) to a phasor data concentrator (PDC) and/or a stability analysis system (SAS) within a power transmission and/or distribution network ("power grid"). These systems and methods are directed at providing stability in the power grid and, more specifically, a stability analysis system and method for estimating damping torque associated with power generators within the power grid. The SAS, as described herein, leverages the advances in PMU technology to estimate the dynamic states of the generators and enables practical estimation of damping torque of individual generators and, further, with respect to individual modes. The SAS described herein estimates dynamic states using high resolution PMU measurements to provide insights for grid stability. Such measurements are increasingly critical to grid operation, as ever greater amounts of generation are provided by entities independent from grid operators, requiring that grid stabilizing contributions from individual generators be quantified and verified without invasive measurements at independent generator facilities. The PMUs are time-synchronized across wide geographical locations, combined with improved algorithms and computational hardware, to estimate dynamic states of the system and capture dynamic performance across a wide area in real-time.

FIG. 1 is a general schematic diagram of an exemplary electrical power network 100. Electrical power network 100 typically includes power plants 102 outputting power through a transmission grid 103, which includes an extra high voltage transmission grid 104 and a high voltage transmission grid 106 through which power is transmitted to an exemplary electrical power distribution system 110. Electrical power network 100 may include, without limitation, any number, type and configuration of extra high voltage transmission grids 104, high voltage transmission grids 106, and electrical power distribution systems 110, as well as any number of consumers within electrical power distribution system 110, high voltage transmission grid 106, e.g., greater than 110-265 kilovolts (kV), and extra high voltage grid 104, e.g., greater than 265 kV.

Electrical power distribution system 110 includes low wattage consumers 112 and industrial medium wattage consumers 114. Electrical power distribution system 110 also includes distributed generators 130, including a city power plant 132, a solar farm 134, and a wind farm 136. While electrical power distribution system 110 is shown with an exemplary number and type of distributed generators 130, electrical power distribution system 110 may include any number and type of distributed generators 130, including, without limitation, diesel generators, micro-turbines, solar collector arrays, photo-voltaic arrays, and wind turbines.

Figure 2:
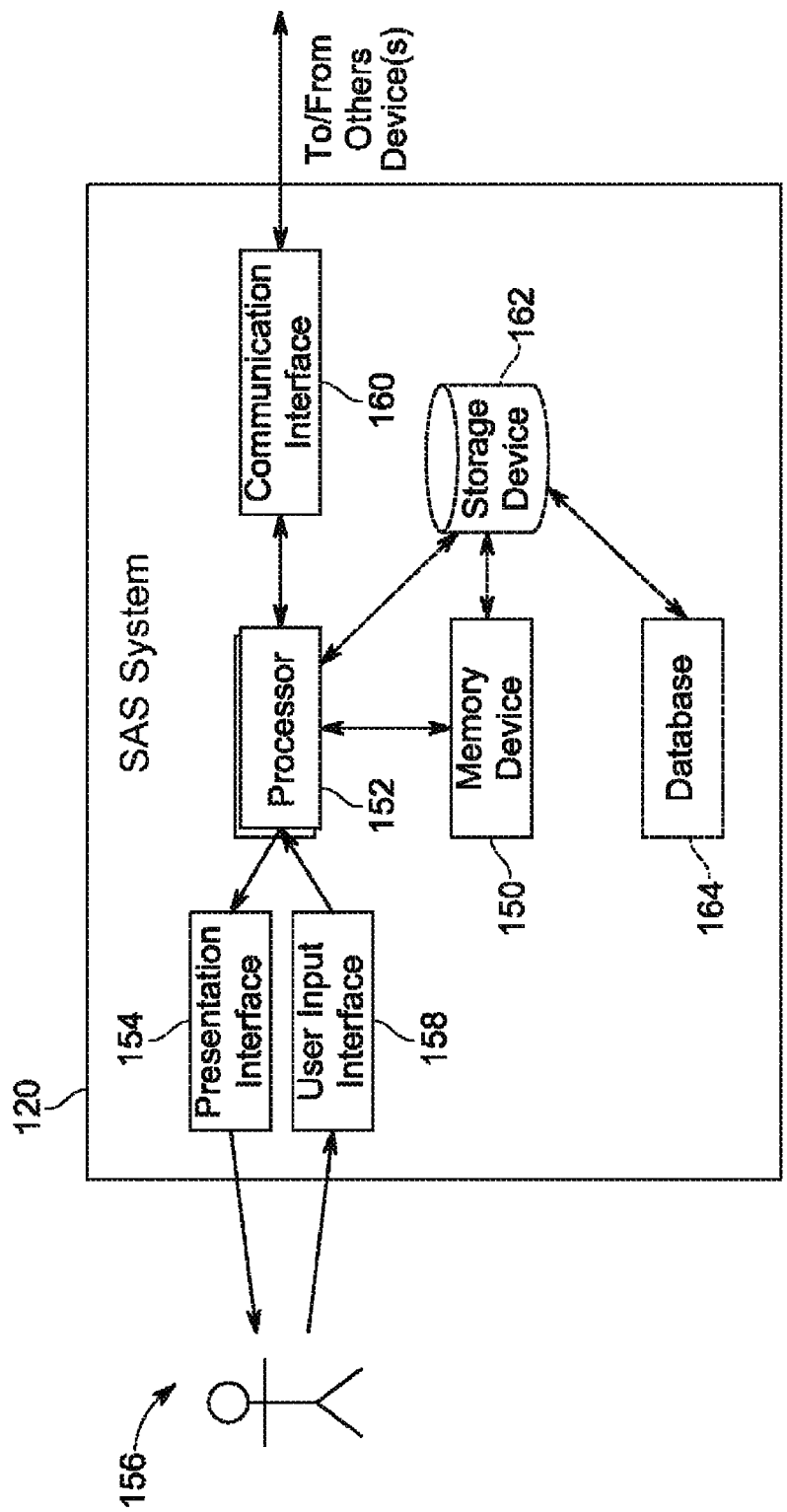
FIG. 2 is a block diagram of an exemplary stability analysis system (SAS) used to analyze the electrical power transmission network shown in FIG. 1.

FIG. 2 is a block diagram of an exemplary stability analysis system (SAS) 120 used to analyze network 100 (shown in FIG. 1). Alternatively, any computer architecture that enables operation of SAS 120 as described herein may be used. SAS 120 facilitates collection of PMU data from power generators' point of interconnections such as in network 100, analysis, measurement, and estimation of dynamic state variables (e.g., generator rotor angle and rotor speed), various stability analytics including but not limited to estimation of generator damping torque contribution, identification of generators with improperly tuned components (e.g., power system stabilizer, exciter), identification of critical generators for control to improve the system stability, identification and tracking of stability margin in real-time, and presentation of analysis results and/or execution of configuration changes to network 100.

In the exemplary embodiment, SAS 120 includes a memory device 150 and a processor 152 operatively coupled to memory device 150 for executing instructions. In some embodiments, executable instructions are stored in memory device 150. SAS 120 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

Further, in the exemplary embodiment, memory device 150 is one or more devices that enable storage and retrieval of information such as executable instructions and/or other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Also, in the exemplary embodiment, memory device 150 may be configured to store a variety of operational data associated with components of power plant 102 and operational data transmitted from PMU's (not shown in FIG. 1) associated with components of transmission grid 103 including, without limitation, voltage and current phasor at points of interest in transmission grid 103.

In some embodiments, SAS 120 includes a presentation interface 154 coupled to processor 152. Presentation interface 154 presents information, such as a user interface and/or an alarm, to a user 156. For example, presentation interface 154 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 154 includes one or more display devices. In addition, or alternatively, presentation interface 154 may include an audio output device (not shown), e.g., an audio adapter and/or a speaker.

In some embodiments, SAS 120 includes a user input interface 158. In the exemplary embodiment, user input interface 158 is coupled to processor 152 and receives input from user 156. User input interface 158 may include, for example, a keyboard, a pointing device, a mouse, a stylus, and/or a touch sensitive panel, e.g., a touch pad or a touch screen. A single component, such as a touch screen, may function as both a display device of presentation interface 154 and user input interface 158.

Further, a communication interface 160 is coupled to processor 152 and is configured to be coupled in communication with one or more other devices such as, without limitation, components in transmission grid 103, another SAS 120, one or more PMU's (not shown in FIG. 2), and any device capable of accessing SAS 120 including, without limitation, a portable laptop computer, a personal digital assistant (PDA), and a smart phone. Communication interface 160 may include, without limitation, a wired network adapter, a wireless network adapter, a mobile telecommunications adapter, a serial communication adapter, and/or a parallel communication adapter. Communication interface 160 may receive data from and/or transmit data to one or more remote devices. For example, a communication interface 160 of one SAS 120 may transmit transaction information to communication interface 160 of another SAS 120 and/or PMU's (not shown in FIG. 2). SAS 120 may be web-enabled for remote communications, for example, with a remote desktop computer (not shown). In the exemplary embodiment, communications interface 160 receives and processes signals from PMU's based on communications protocols at least partially governed by standards, including, without limitation, the Institute of Electrical and Electronics Engineers (IEEE) C37.118-2 standard.

Also, presentation interface 154 and/or communication interface 160 are both capable of providing information suitable for use with the methods described herein, e.g., to user 156 or another device. Accordingly, presentation interface 154 and communication interface 160 may be referred to as output devices. Similarly, user input interface 158 and communication interface 160 are capable of receiving information suitable for use with the methods described herein and may be referred to as input devices.

Further, processor 152 and/or memory device 150 may also be operatively coupled to a storage device 162. Storage device 162 is any computer-operated hardware suitable for storing and/or retrieving data, such as, but not limited to, data associated with a database 164. In the exemplary embodiment, storage device 162 is integrated in SAS 120. For example, SAS 120 may include one or more hard disk drives as storage device 162. Moreover, for example, storage device 162 may include multiple storage units such as hard disks and/or solid state disks in a redundant array of inexpensive disks (RAID) configuration. Storage device 162 may include a storage area network (SAN), a network attached storage (NAS) system, and/or cloud-based storage. Alternatively, storage device 162 is external to SAS 120 and may be accessed by a storage interface (not shown).

Moreover, in the exemplary embodiment, database 164 contains a variety of static and dynamic operational data associated with components, some of which may be transmitted from PMU's (not shown in FIG. 2) associated with components in network 100 including, without limitation, voltage and current phasors at points of interest in network 100.

The embodiments illustrated and described herein as well as embodiments not specifically described herein but within the scope of aspects of the disclosure, constitute exemplary means for estimating damping torque using data values from one or more PMUs. For example, SAS 120, and any other similar computer device added thereto or included within, when integrated together, include sufficient computer-readable storage media that is/are programmed with sufficient computer-executable instructions to execute processes and techniques with a processor as described herein. Specifically, SAS 120 and any other similar computer device added thereto or included within, when integrated together, constitute an exemplary means for estimating damping torque associated with one or more power generators in network 100.

Figure 3:
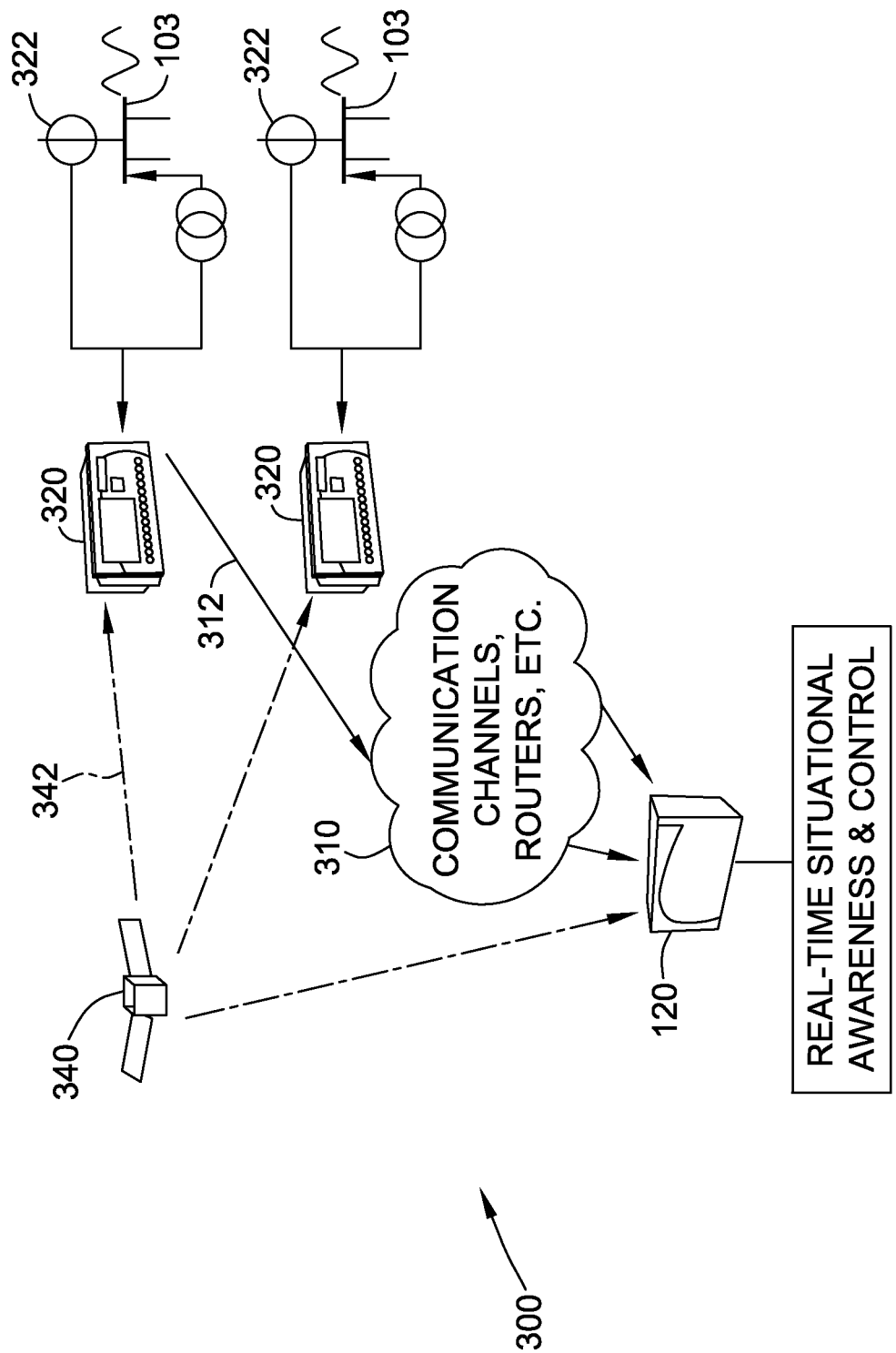
FIG. 3 is a data flow diagram of an exemplary wide-area measurement system (WAMS), including a plurality of phasor measurement units (PMU's), for monitoring and managing the electrical power network shown in FIG. 1 using the SAS shown in FIG. 2.

FIG. 3 is a data flow diagram of an exemplary wide-area measurement system (WAMS) 300, including a plurality of phasor measurement units (PMU's) 320, for monitoring and managing electrical power network 100 (shown in FIG. 1) using the SAS 120 (shown in FIG. 2). WAMS 300 includes a data network 310 which communicatively couples one or more PMU's 320 and at least one phasor data concentrator and/or SAS 120 using data links 312. Each PMU 320 is communicatively coupled to transmission grid 103 (shown in FIG. 1) at a particular location, such as substation 322. In some embodiments, substation 322 is the point where power plant 102 is connected to transmission grid 103. Further, in some embodiments, PMU's 320 and SAS 120 are communicatively coupled to a time synchronization source such as, for example, a satellite 340. A wireless data link 342 allows PMU 320 and SAS 120 to communicate with satellite 340 to facilitate synchronization of samples collected using known methods of time stamping.

During operation, in the exemplary embodiment, PMU 320 measures and/or collects data from substation 322 within network 100, such as, for example, phasor data. PMU 320 may sample data values many times per second, such as between 10 and 120 samples per second. PMU 320 also synchronizes time with satellite 340 such that the collected data values are time stamped, allowing values from multiple PMU's 320 to be time-correlated together during analysis. PMU 320 transmits the measured values as a "data streams" across data network 310 to a management device, such as SAS 120. SAS 120 uses this data stream for operational tasks, such as estimating damping torque of one or more power generators within network 100.

Figure 4:
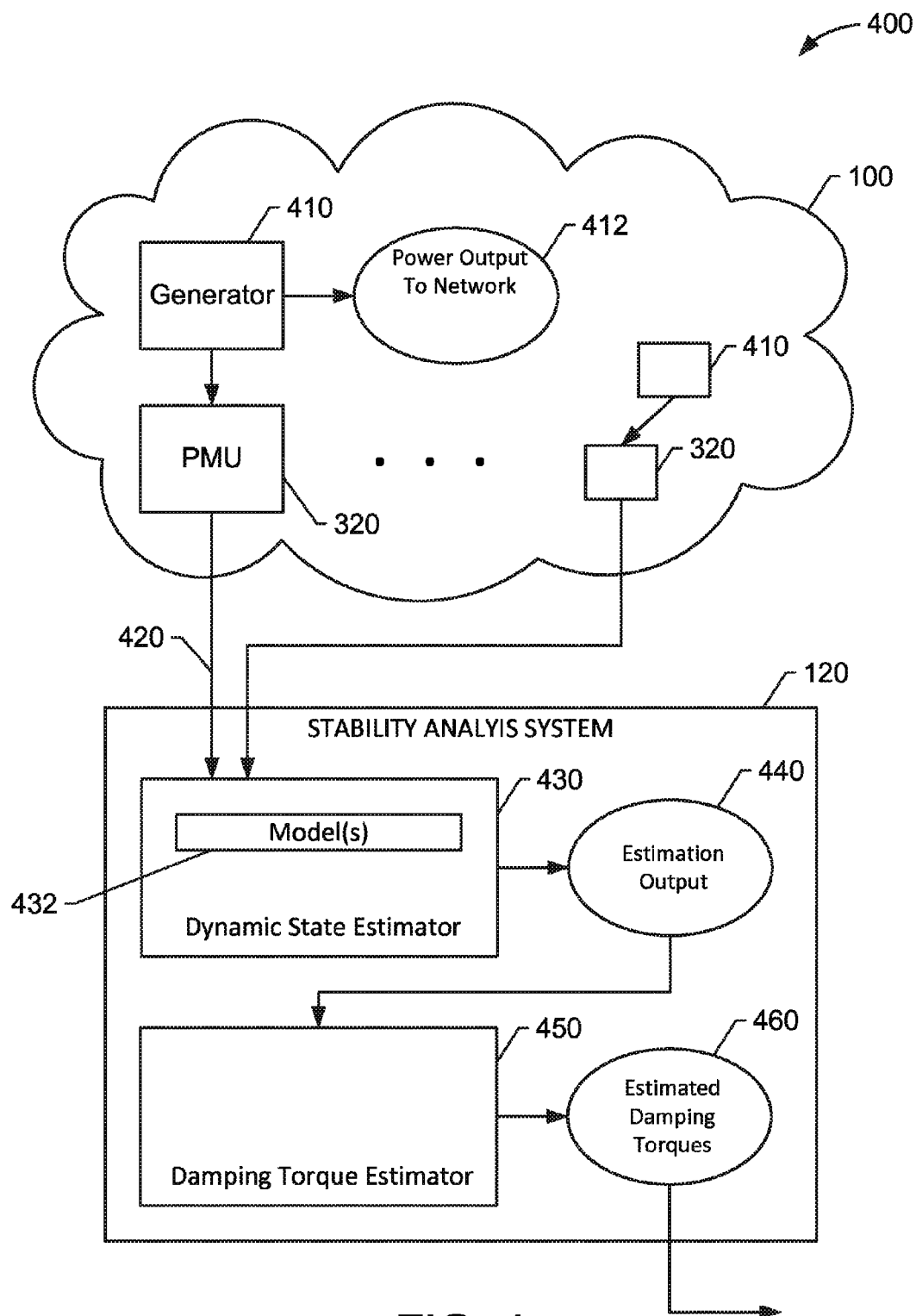
FIG. 4 is a diagram of a portion of the electrical power network shown in FIG. 1, including an exemplary generator and the WAMS shown in FIG. 3, in which PMU data is collected and analyzed by the SAS shown in FIG. 2 including an exemplary dynamic state estimator.

FIG. 4 is a diagram 400 of electrical power network 100 including a generator 410 and WAMS 300 (shown in FIG.

3), in which PMU data is collected and analyzed by SAS 120. Generator 410 produces and transmits electric power output 412 to network 100. In the exemplary embodiment, SAS 120 includes a dynamic state estimator 430 that includes a model 432 for generating dynamic states (e.g., speed and angle) of one or more generators 410 using real-time PMU measurements from one or more PMUs 320. These dynamic states are provided as estimation output 440 to a damping torque estimator 450, which generates estimated damping torques 460.

More specifically, in the exemplary embodiment, model 432 (e.g., a dynamic model of the generator) uses the PMU data from PMU 320 in the form of voltage and current phasors at a generator bus (not shown) to estimate the dynamic variables at the current time sample, as well as predict these variables for several time samples in the future. In addition, model 432 is configured to use measured and calculated values of certain inputs as well as estimated values, e.g., and without limitation, measured and estimated power, measured and estimated speed, and calculated torque.

In one embodiment, dynamic state estimator 430 implements a state observer algorithm such as, for example, a Luenberger Observer-based approach. Assumptions to apply one version of the Luenberger Observer include one or more of (i) an underlying physical system that may be approximated by a linear, time invariant (LTI) model, known to reasonable accuracy; (ii) the LTI model must be observable (e.g., passing the algebraic rank test for observability with sufficient margin to allow robust numeric calculation); and (iii) real-time measurement of both input quantities and outputs are available to provide to the observer algorithm. Historically, these assumptions have been too stringent for practical use, particularly in the power systems case in which it was often seen as impractical to assume that the wide range of quantities that could serve as driving inputs to the power grid would be available as measurements. Here, data from PMUs 320 overcomes at least some of these historical limitations. In the context of states associated with the behavior of a synchronous generator (e.g., generator 410) tied to an alternating current (AC) grid (e.g., network 100), PMUs 320 provide output quantities that may be used. With an appropriately constructed model 432, dynamic state estimator 430 uses signals representing generator input quantities to feed the state observer, and without invasive measurement internal to generator 410.

A synchronous machine (e.g., generator 410) coupled to an AC grid (e.g., network 100) is described, in this exemplary embodiment, as having two primary input signals: mechanical shaft torque and applied field winding voltage. The focus starts first with generator 410, prior to considering associated excitation and governor control systems. While choice of quantities to be treated as outputs may vary with a modeling approach, this exemplary embodiment considers stator currents as the output determined by generator 410. Generator terminal voltage and delivered electrical power are then determined by interaction of these currents with the attached AC network through power flow equations. In grid operations, SAS 120 focuses on phasor behavior of the positive sequence element of these currents as nearly sinusoidal signals. This behavior is determined by magnitude, phase angle, and frequency, as provided by PMUs 320 (e.g., reporting of power output 412 delivered from generator 410 to network 100).

In the exemplary embodiment, dynamic state estimator 430 estimates input quantities using a "bootstrapping" process that evaluates simpler models 432 to recover input quantities from algebraic relationships, then refines the estimate of internal generator states in more detailed models 432. This heuristic approach may be made rigorous by employing the theory of reduced dimension Luenberger Observers, and exploiting the fact that several of the PMU quantities available are direct measurements of a subset of system states. For example, for the case of recovery of the input torque signal, given PMU measurements of generator current delivered to network 100, and terminal voltage or algebraically related quantities at the step-up transformer (not shown), SAS 120 has data of the electrical output power. One element of the bootstrap, in this exemplary embodiment, is to also use voltage angle and frequency measurements to directly derive a "measurement" of angular acceleration. Subsequently, a "swing equation" that describes rotor dynamics in a three-phase synchronous generator driven by a prime mover, provides an algebraic relation from acceleration and electrical power to recover input mechanical torque. Implicit in the use of the swing equation is the generator's rotational inertia. This exemplary approach, through construction of the reduced dimension observer, allows augmentation of the state space to inertia as a pseudo-state, and allowing the observer to also yield an estimate of its value. This reduced dimension Luenberger Observer architecture provides an advantage of being inherently distributed, with estimation of each generator's internal states, and damping torque contribution which may be estimated locally.

In another embodiment, dynamic state estimator 430 implements a Kalman Filter-based ("KF") approach (e.g., Kalman Filter and its variants, e.g., Extended Kalman Filter (EKF)). In this embodiment, the KF approach recursively uses time series of observed, noisy measurements to produce statistically optimal estimates of unknown states/variables. During the estimation process, the dynamic state of the power system is treated as a random variable with an estimated mean and covariance with consideration of measurement noise. On consideration for applying a KF approach with power systems is the ability to deal with a non-linear mathematical model of the system dynamics defined by differential and algebraic equations (DAE). To simplify the process, the non-linear DAEs are approximated through a linearization and a Jacobian computation. Such a linearization introduces approximation errors with may become significant over time. Further, the computation of Jacobian is computationally expensive since it has to be performed at each iteration of the algorithm.

To overcome at least some of these limitations, in one embodiment, an Unscented Transformation (UT) is used (e.g., a derivative-free approach). The UT is combined with KF to form an Unscented Kalman filter (UKF) approach, which is simpler and computationally more efficient. The UKF approach is a general method for approximating non-linear transformations of probability distributions. The core idea is to find consistent, efficient, and unbiased estimates of the mean and covariance of the random variables undergoing a non-linear transformation given by the DAE model. Using the principle that a set of discretely sampled points may be used to parameterize mean and covariance, the estimator yields performance similar to the KF for linear systems, yet generalizes to non-linear systems without the linearization steps required by the EKF.

Figure 5:
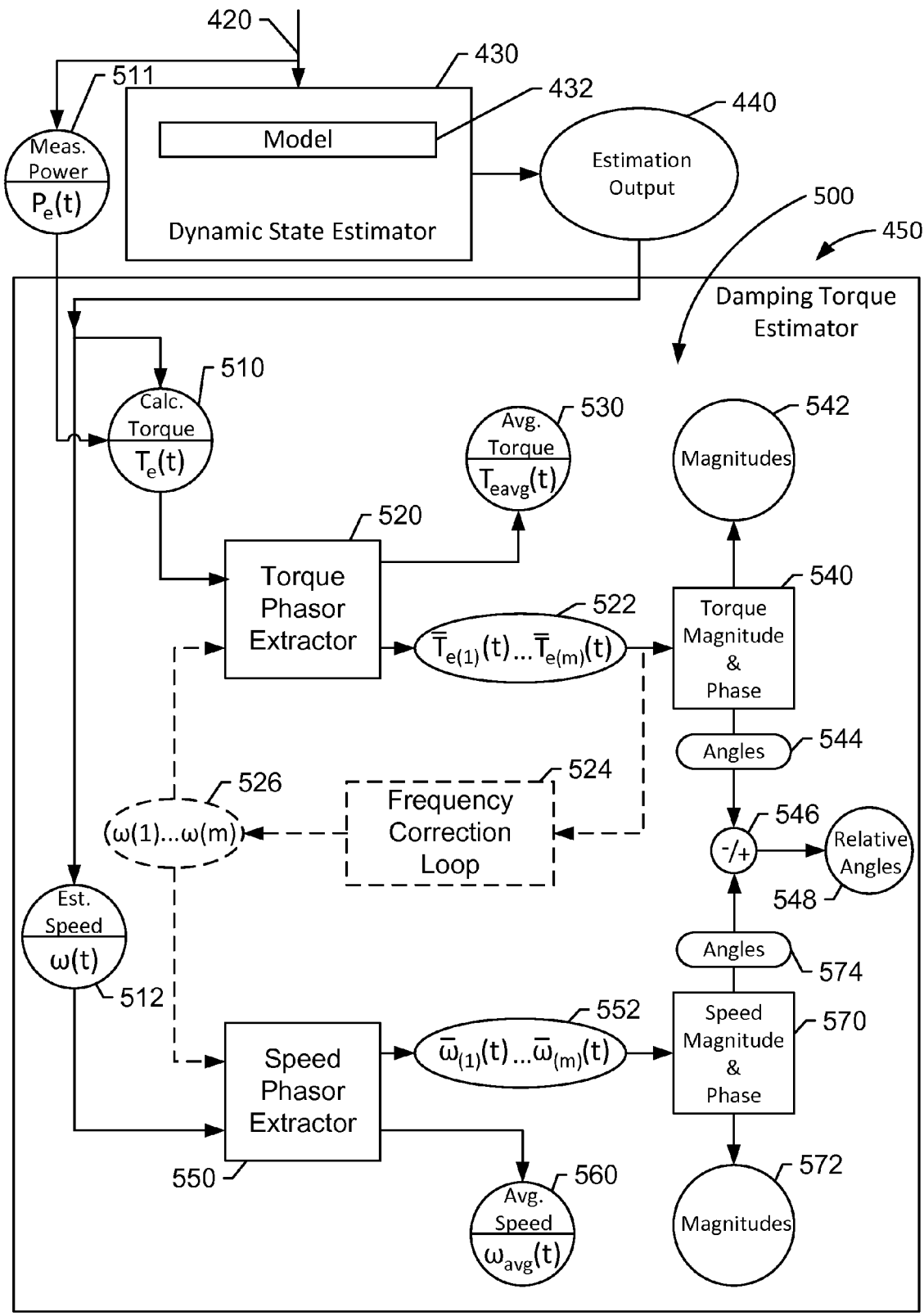
FIG. 5 is a diagram of an exemplary process performed by the damping torque estimator shown in FIG. 4 for estimating damping torque of the generator shown in FIG. 4 using estimation outputs generated by the dynamic state estimator shown in FIG. 4.

FIG. 5 is a diagram of a process 500 performed by damping torque estimator 450 for estimating damping torque of generator 410 (shown in FIG. 4) using estimation outputs generated by dynamic state estimator 430. In the exemplary embodiment, electromechanical torque, $T_e$, of generator 410 is represented in a power angle (δ) and speed (ω) plane. Instead of using the absolute values, the exemplary embodiment uses the deviation of these quantities (e.g., $\Delta T_e$, $\Delta\delta$, and $\Delta\omega$). Following a disturbance in network 100 (shown in FIG. 1), $T_e$, δ, and ω oscillate with a frequency that characterizes electromechanical response of the generators on network 100. Assuming uni-modal characteristics, the deviation in these quantities may be expressed as sinusoids of the same frequency $\omega_1$, but different phases. As a result, torque deviation $\Delta T_e$, power angle deviation $\Delta\delta$, and speed deviation $\Delta\omega$ may be expressed as rotating phasors $\overline{\Delta T_e}$, $\overline{\Delta\delta}$, and $\overline{\Delta\omega}$, respectively.

Figure 6:
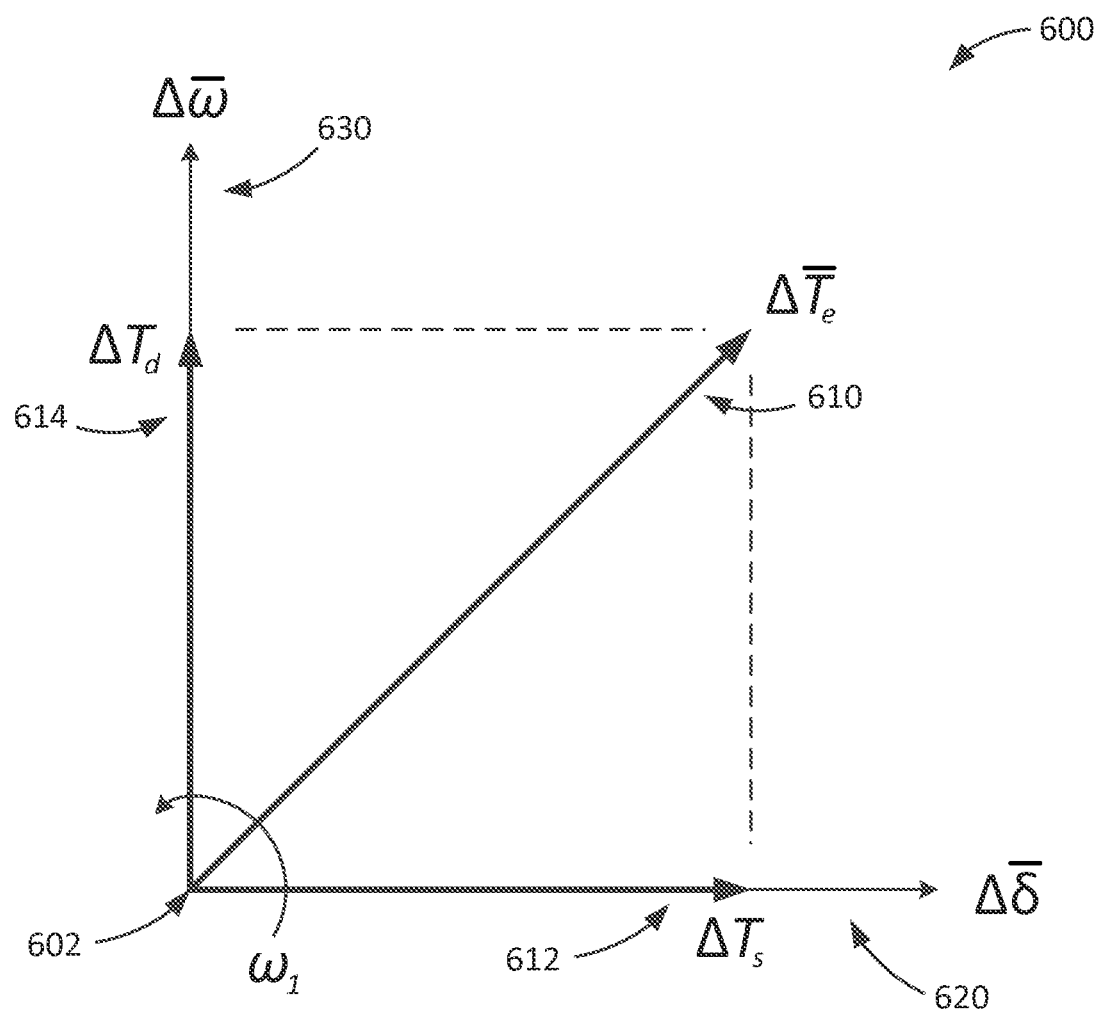
FIG. 6 is a graph of the alignment of phasors $\Delta \overline{T}_e$, $\Delta \overline{\delta}$, and $\Delta \overline{\omega}$ associated with the generator shown in FIG. 4.

FIG. 6 is a graph 600 of the alignment of estimated torque deviation phasor $\overline{\Delta T_e}$ 610, power angle deviation phasor $\overline{\Delta\delta}$ 620, and speed deviation $\overline{\Delta\omega}$ 630 associated with generator 410 (shown in FIG. 4). Graph 600 defines an origin 602. In the exemplary embodiment, $\overline{\Delta T_e}$ 610 is the torque phasor, $\overline{\Delta\delta}$ 620 is the angle phasor, and $\overline{\Delta\omega}$ 630 is the speed phasor, and $\overline{\Delta\omega}$ 630 axis leads $\overline{\Delta\delta}$ 620 axis by 90 degrees, since $$\Delta\omega = \frac{d\Delta\delta}{dt}.$$

The angular speed of rotation is equal to the angular frequency of the oscillation. As such, the torque phasor $\overline{\Delta T_e}$ 610 may be written as:

$$\overline{\Delta T_e} = \Delta T_s + j\Delta T_d = K_s\overline{\Delta\delta} + K_d\overline{\Delta\omega}, \quad \text{(Eq. 1)}$$

were j indicates that the particular axis, in the rectangular coordinate system, is 90 degrees rotated (e.g., $\overline{\Delta\omega}$ 630 axis is 90 degrees ahead of $\overline{\Delta\delta}$ 620 axis). The component of torque phasor $\overline{\Delta T_e}$ 610 along speed phasor $\overline{\Delta\omega}$ 630 is damping torque $\Delta T_d$ 614, and $K_d$ is the damping torque coefficient. The component of torque phasor $\overline{\Delta T_e}$ 610 along angle phasor $\overline{\Delta\omega}$ 620 is synchronizing torque $\Delta T_s$ 612, and $K_s$ is the synchronizing torque coefficient.

Referring now to FIGS. 5 and 6, in the exemplary embodiment, damping torque estimator 450 estimates damping torque $\Delta T_d$ 614 and the damping torque coefficient $K_d$ of, for example, generator 410, from PMU measurements 420. Using the speed, ω, estimated by dynamic state estimator 430 (e.g., via the DSE algorithm) and measured power output, $P_e$, at the generator terminal (e.g., from PMU 320), the electromechanical torque, $T_e$, of generator 410 may be calculated by:

$$T_e = \frac{P_e}{\omega}, \quad \text{(Eq. 2)}$$

where the sub-script 'e' indicates that the associated variable is electrical torque or power, as opposed to, for example, mechanical torque or power. Alternatively, rather than using estimated speed ω values, measured real-time speed ω values from installed instrumentation are used.

In a practical power system, the oscillations in generators 400 may have the signature of multiple modes. The concept of damping torque remains the same, except that the individual modes are analyzed in separate rotating phasor reference frames whose speeds correspond to the respective modal angular frequencies. In the exemplary embodiment, damping torque estimator 450 implements an estimation process 500 for a generic, multi-modal system. Below, the torque and speed are expressed as space phasors $\vec{T}_e$ and $\vec{\omega}$ instead of phasors $\overline{T}_e$ and $\overline{\omega}$. The components of the space phasors are measured in a common rotating direct-quadrature ("d–q") reference frame. A subscript i is used herein to refer to the $i^{th}$ mode.

Assuming there are m modes, the calculated electromagnetic torque $T_e(t)$ 510 obtained from Eq. 2 through measured power $P_e(t)$ 511 and estimated speed ω(t) 512 (in some embodiments, measured speed ω(t) is used) may be expressed as:

$$T_e(t)=T_{eavg}(t)+Re\Sigma_{i=1}^m\{\vec{T}_{e(i)}e^{j\omega_i t}\}, \quad \text{(Eq. 3)}$$

where $T_{eavg}(t)$ is the average value of the torque, and where "Re" indicates the real part of the complex quantity $\vec{T}_e$, ω is rotor speed, t is time, j represents the quadrature axis, and i represents the generator index 'i'. The space phasor may be decomposed into the individual rotating d–q reference frames as:

$$T_e(t)=T_{eavg}(t)+\Sigma_{i=1}^m\{T_{ed(i)}(t)\cos\phi_i(t)-T_{eq(i)}(t)\sin\phi_i(t)\}. \quad \text{(Eq. 4)}$$

Here, $\phi_i(t)=\omega_i t+\phi_{0(i)}$, where $\omega_i$ is the estimated speed of the $i^{th}$ modal angular frequency, and $$\varphi_{0(i)} = \tan^{-1}\left(\frac{T_{eq(i)}(t)}{T_{ed(i)}(t)}\right)$$

is the angle at which the estimated space phasor gets locked with its d–q reference frame.

In the exemplary embodiment, the objective for damping torque estimator 450 is to compute the values of $T_{eavg}(t)$ 530, $T_{eq(i)}(t)$, and $T_{ed(i)}(t)$. Damping torque estimator 450 implements a torque phasor extraction 520 using a recursive Kalman Filtering approach to estimate a parameter vector:

$$\theta = [T_{eavg}(t),T_{ed(1)}(t),\ldots,T_{ed(m)}(t),$$
$$T_{eq(1)}(t),\ldots,T_{eq(m)}(t)]^T. \quad \text{(Eq. 5)}$$

At each iteration, several steps are performed. Step 1 includes calculating a prediction error:

$$\epsilon(t)=T_e(t)-\phi(t)\theta(t-1), \quad \text{(Eq. 6)}$$

where $\phi(t)$ is a regressor expressed as:

$$\phi(t)=[1,\cos\phi_1(t),\ldots,\cos\phi_m(t),$$
$$-\sin\phi_1(t),\ldots,-\sin\phi_m(t)]. \quad \text{(Eq. 7)}$$

Step 2 includes computing the Kalman gain vector $K_d(t)$:

$$K_d(t) = \frac{P(t-1)\phi^T(t)}{R_2 + \phi(t)P(t-1)\phi^T(t)}. \quad \text{(Eq. 8)}$$

Step 3 includes updating the covariance matrix P(t):

$$P(t)=[I-K_d(t)\phi(t)]P(t-1)+R_1. \quad \text{(Eq. 9)}$$

Step 4 includes updating the parameter vector θ(t):

$$\theta(t)=\theta(t-1)+K_d(t)\epsilon(t). \quad \text{(Eq. 10)}$$

The parameter vector θ(t) is initialized with zeros, and the covariance matrix P(t) is initialized with a high value (e.g., $10^4 I$, where I is the identity matrix). $R_1$ is a diagonal matrix whose elements are normalized with respect to $R_2$, which leads $R_2$ to become unity. Choice of $R_1$ depends on the process noise covariance, which is difficult to know a-priori. Hence, $R_1$ may be tuned to attain a proper balance between the filter convergence speed and tranquility in parameter estimations.

Further, the modal frequencies may be initialized with their nominal values obtained, for example, from linear analysis, which may not always be straightforward for large practical power systems. To avoid this, in the exemplary embodiment, a self-initialization method is employed where the estimation algorithms appropriate for ambient conditions are used to obtain the frequency spectrum of the measured data to initialize the frequencies. Historical data and/or operator experience may also be employed. This initial frequency is then updated with time depending on the actual measurements. Changes in frequencies with varying operating condition are tracked online through frequency correction loops for individual modes, wherein PI compensators minimize the error between the phase angles in consecutive samples.

In the exemplary embodiment, damping torque estimator 450 determines torque magnitude and phase 540 from outputs 522 of torque phasor extractor 520 to generate magnitudes 542 and angles 544. In the exemplary embodiment, to avoid the practical limitation, a self-initialization frequency correction loop 524 is employed where the estimation algorithms appropriate for ambient conditions are used to obtain the frequency spectrum of the measured data to initialize the frequencies. Frequency correction loop 524 generates frequency corrections 526.

In some embodiments, damping torque estimator 450 uses speed phasor extractor 550 to generate speed phase extraction outputs 552 and an average speed $\omega_{avg}(t)$ 560. Speed magnitude and phase 570 are determined to generate magnitudes 572 and angles 574. Angles 544 and 574 are compared 546 to determine relative angles 548 for each mode.

In the exemplary embodiment, the damping torque coefficient, $K_d$, is determined by normalizing the magnitude of damping torque phasor 542 by the magnitude of speed phasor 572, as such:

$$K_d = \frac{|\overline{T}_{e(m)}(t)|}{|\overline{\omega}_{e(m)}(t)|} \cos\left[\text{angle}\left\{\frac{\overline{T}_{e(m)}(t)}{\overline{\omega}_{e(m)}(t)}\right\}\right].$$  (Eq. 11)

Also, in the exemplary embodiment, outputs from damping torque estimator, e.g., estimated damping torques 460 (shown in FIG. 4) and/or estimated damping torque coefficients $K_d$ are used to identify generators with improperly tuned components, e.g., including, but not limited to, automatic voltage regulators (AVRs), exciters, and power system stabilizers (PSSs), identify critical generators for control action to improve system stability, identify generator contribution to global system stability, and to track system stability in real-time.

Further, in the exemplary embodiment, in addition to informational determinations as described above, outputs from damping torque estimator 450, e.g., and without limitation, estimated damping torques 460 and estimated damping torque coefficients $K_d$, are used to generate control signals to dampen torque oscillations through control of one or more generators, e.g., generator 410 (shown in FIG. 4) residing within power plants 102 (shown in FIG. 1) and/or rotating-type distributed generators 130 (shown in FIG. 1). Specifically, for a system such as electrical power network 100 (shown in FIG. 1) to be oscillatory stable with respect to electromechanical modes, the damping torque coefficient of the generators must be positive. The damping torque for the electromechanical modes is naturally provided by generator damper windings (if present therein). Power system stabilizers (PSSs) are used to achieve desired damping for certain operating conditions. Once tuned, their control parameters remain fixed. Since damping torque is a function of system operating conditions, it is possible that some of the PSSs become ineffective in providing positive damping. Therefore, by systematically computing and tracking the generator damping torque coefficient and/or the damping torque values in real time, they can be used as an indicator for oscillatory stability. The approach can quickly predict the system oscillatory condition, pinpoint problematic generators or PSSs, and identify effective controllable generators, and facilitate the operators to take preventive or corrective actions.

Moreover, for example, determinations of estimated damping torques 460 and/or estimated damping torque coefficients $K_d$ are transmitted to a control system that is networked to generators 410. Such determinations are individualized for each generator 410 and are transmitted to the associated PSSs to extend the margins to system stability parameters through control of each generator 410. The PSSs transmit their stability signals to the associated AVRs to regulate excitation of the associated generators 410. The damping features of each generator 410 are used to dampen the oscillations associated with each generator 410 with respect to the other generators 410 through generating a damping torque on the associated rotors of generators 410 that is in phase with the determined speed magnitude and phase 570.

Figure 7:
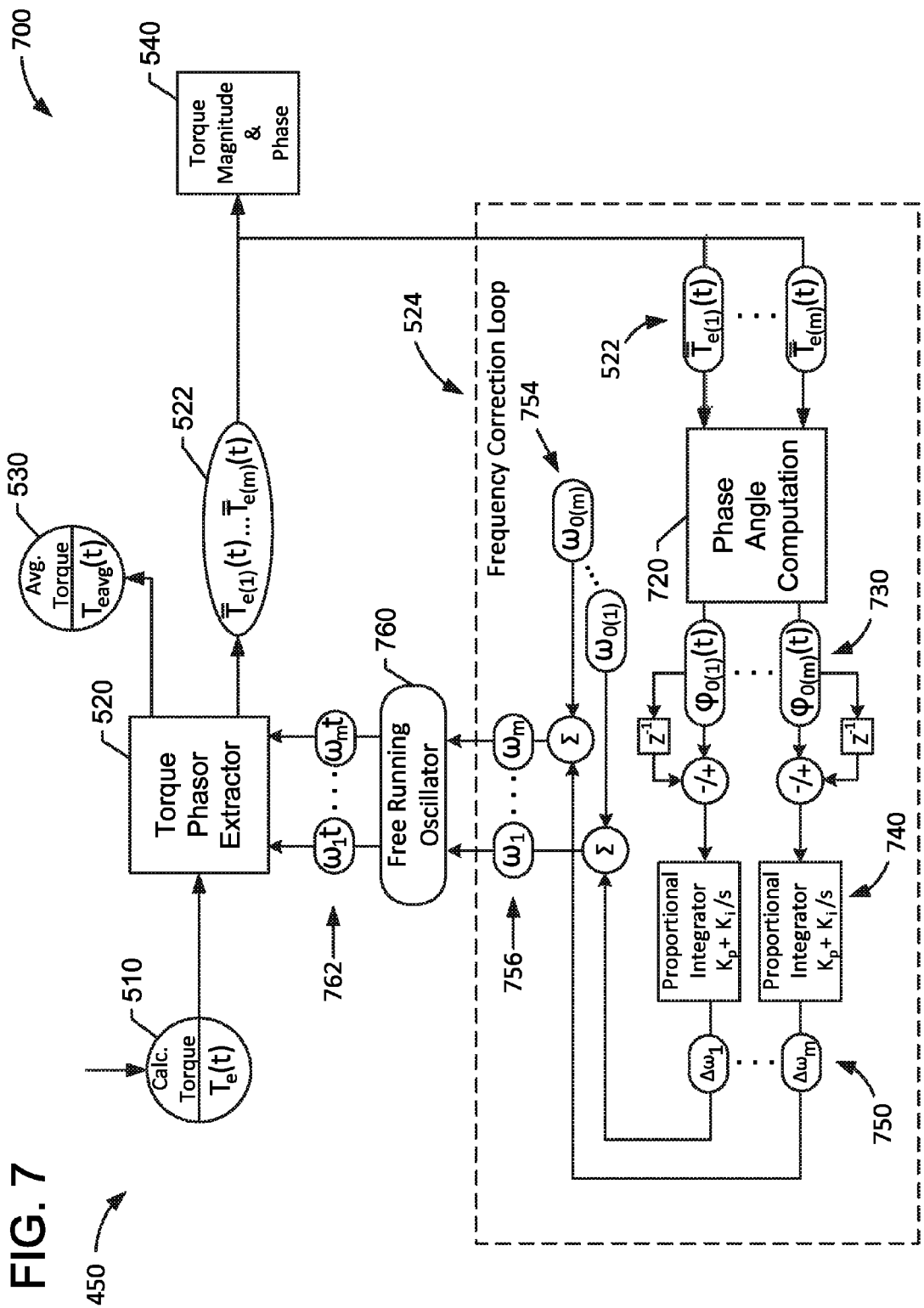
FIG. 7 is a diagram of an exemplary process performed by an exemplary torque phasor extractor shown in FIG. 5 for estimating torque phasors corresponding to each oscillatory mode.

FIG. 7 is a diagram of an exemplary process 700 performed by torque phasor extractor 520 (shown in FIG. 5) for estimating torque phasors corresponding to each oscillatory mode. The modal frequencies may be initialized with their nominal values obtained from linear analysis, which may not be straightforward for large, practical systems. In the exemplary embodiment, to avoid the practical limitation, a self-initialization frequency correction loop 524 (shown in FIG. 5) is employed where the estimation algorithms appropriate for ambient conditions are used to obtain the frequency spectrum of the measured data to initialize the frequencies. Historic data or operator experience may also play a role in this process. The initial frequency 754 is then updated with time depending on the actual measurements. Changes in frequencies with varying operating condition are tracked online through frequency correction loops for individual modes wherein PI compensators 740 minimize the error between phase angles 750 in consecutive samples (e.g., phase angle computation 720 in frequency correction loop 524). The frequency corrections may be limited to a reasonable band (e.g., ±0.1 Hz) to avoid overlap between adjacent frequencies present in a multi-modal signal. A free-running oscillator 760 may be employed for integrating the frequencies, $\omega_i$ 756, to generate angles $\phi_i(t)$ 762.

Figure 8:
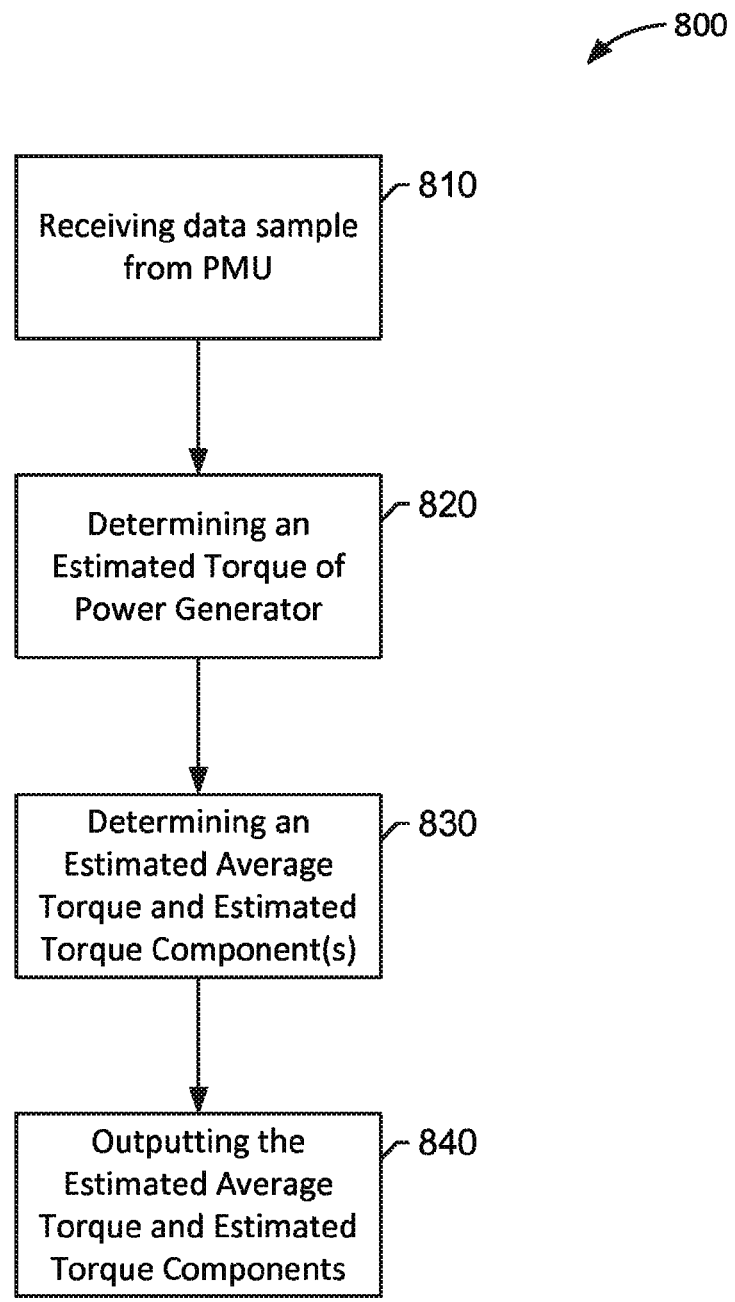
FIG. 8 is a flow chart of an exemplary method of non-invasive estimation of damping torque for the power generator shown in FIG. 4 using the SAS shown in FIG. 2.

FIG. 8 is a flow chart of an exemplary method 800 of non-invasive estimation of damping torque for power generator 410 (shown in FIG. 4) using stability analysis system (SAS) 120 (shown in FIG. 4). In the exemplary embodiment, method 800 is performed by one or more computing systems such as SAS 120 (shown in FIG. 2), or computing device 910 (shown in FIG. 9). Method 800 includes receiving 810 a first data sample set from PMU 320 (shown in FIG. 3). Method 800 also includes determining 820 an estimated torque of power generator 410 based at least in part on the first data sample set.

In the exemplary embodiment, method 800 includes determining 830 an estimated average torque and one or more estimated torque components based at least in part on the estimated torque. In some embodiments, each torque component of the one or more estimated torque components is associated with an oscillatory mode characterized by modal angular frequency. Further, in some embodiments, determining 830 an estimated average torque and one or more estimated torque components includes estimating the average torque and the one or more estimated torque components using a system identification technique. In some embodiments, the system identification technique is a Kalman filter. Alternatively, any system identification technique is used, including, without limitation, particle filters, Luenberger Observers, and adaptive vector quantization (AVQ). Additionally, in some embodiments, determining 830 an estimated average torque and one or more estimated torque components is further based at least in part on determining values for the estimated average torque at a time, t, $T_{eavg}(t)$, and m estimated torque components in a d–q reference frame, $T_{ed(j)}$ and $T_{eq(i)}$, where i=1 to m, such that the estimated torque at time t, $T_e(t)$, is substantially equal to $T_{eavg}(t)+\Sigma_{i=1}^{m}\{T_{ed(i)}(t)\cos\phi_i(t)-T_{eq(i)}(t)\sin\phi_i(t)\}$, where $\phi_i(t)=\omega_i t+\omega_{0(i)}$ is the estimated angle, where $\omega_i$ is the estimated speed of the $i^{th}$ modal angular frequency, and $$\varphi_{0(i)} = \tan^{-1}\left(\frac{T_{eq(i)}(t)}{T_{ed(i)}(t)}\right)$$

is the angle at which the estimated space phasor gets locked with its d–q reference frame. In some embodiments, the first data sample includes a discrete value for a sample of power, $P_e$, at a time, t, wherein the estimated torque is computed as a ratio of the power, $P_e$, to an estimated speed, $\omega$, of the generator.

In the exemplary embodiment, method 800 includes outputting 840 the estimated average torque and the one or more estimated torque components to an operator for use in stability analysis of one or more of the power generator and the power network. In some embodiments, method 800 also includes initializing a plurality of frequencies associated with the one or more torque components using ambient condition data associated with the power generator and/or updating the plurality of frequencies using a proportional-integral compensator to minimize error between phase angles in consecutive samples. As used herein, the term "ambient condition data" refers to steady-state conditions, i.e., conditions in the absence of disturbances.

Figure 9:
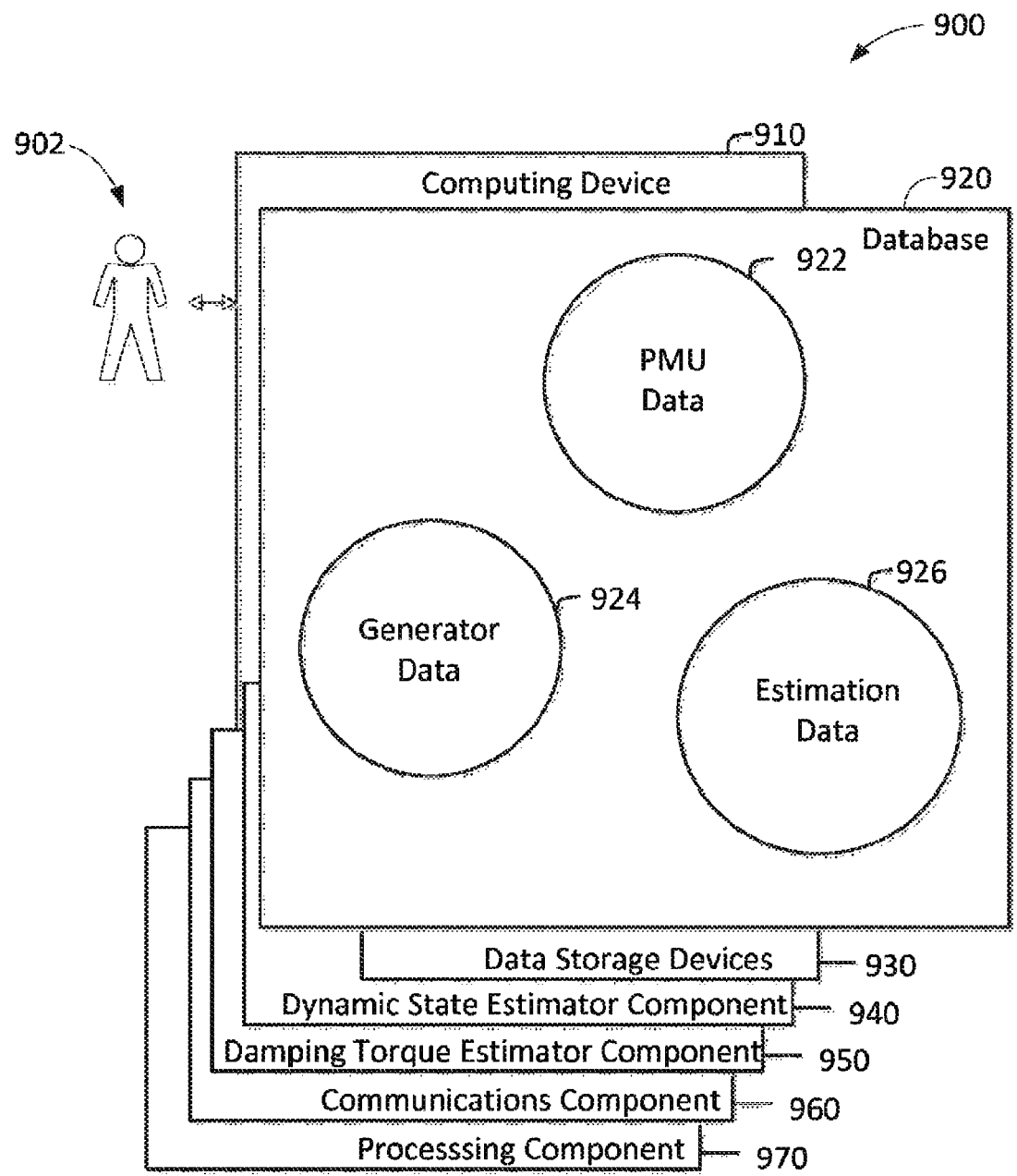
FIG. 9 illustrates an exemplary configuration of a database within a computing device, along with other related computing components, that may be used for non-invasive estimation of damping torque as described herein.

FIG. 9 illustrates an exemplary configuration 900 of a database 920 within a computing device 910, along with other related computing components, that may be used for non-invasive estimation of damping torque as described herein. Database 920 is coupled to several separate components within computing device 910, which perform specific tasks. In the exemplary embodiment, computing device 910 may be SAS 120 (shown in FIGS. 2-4).

In the exemplary embodiment, database 920 includes PMU data 922, network data 924, and estimation data 926. PMU data 922 includes information associated with data streams from devices such as PMU 320 (shown in FIG. 3). Network data 924 includes information associated with network 100 (shown in FIGS. 1 and 4), such as model 432 (shown in FIG. 4). Estimation data 926 includes information associated with estimation values such as estimation output 440 (shown in FIG. 4) and estimated damping torques 460 (shown in FIG. 4).

Computing device 910 includes the database 920, as well as data storage devices 930. Computing device 910 also includes a dynamic state estimator component 940 for estimating states associated with, for example, generators 400 (shown in FIG. 4). Computing device 910 also includes a damping torque estimator component 950 for computing damping torque estimations based on, for example, outputs of dynamic state estimator component 950. Computing device 1710 also includes a communicating component 960 for communicating with PMU's 320 and/or other computing devices. A processing component 980 assists with execution of computer-executable instructions associated with the system.

The above described methods and systems include analyzing streams of data sent from phasor measurement units (PMU's) to a phasor data concentrator (PDC) and/or a stability analysis system (SAS) within a power transmission and/or distribution network ("power grid"). These systems and methods are directed at providing stability in the power grid and, more specifically, a stability analysis system and method for estimating damping torque associated with power generators within the power grid. The SAS, as described herein, leverages the advances in PMU technology to estimate the dynamic states of the generators and enables practical estimation of damping torque of individual generators and, further, with respect to individual modes. The SAS described herein estimates dynamic states using high resolution PMU measurements to provide insights for grid stability. Such measurements are increasingly critical to grid operation, as ever greater amounts of generation are provided by entities independent from grid operators, requiring that grid stabilizing contributions from individual generators be quantified and verified without invasive measurements at independent generator facilities. The PMUs are time-synchronized across wide geographical locations, combined with improved algorithms and computational hardware, to estimate dynamic states of the system and capture dynamic performance across a wide area in real-time.

At least one of the technical problems addressed by this system includes: (i) instability in the power network based on, for example, interactions among generators during a disturbance on the network; (ii) difficulty determining damping torque contribution of individual power generators to system stability on a broader power network; (iii) requiring taking generators offline to perform stage testing to identify damping parameters causing, for example, a reduction or loss of power generation on the network and/or a revenue loss; (iv) difficulty determining individual modal contributions of individual power generators to system stability; and (v) computational complexity and inaccuracies associated with relying on broader system models for determining aspects of system stability.

An exemplary technical effect of the methods, systems, and apparatus described herein includes at least one of: (a) estimating a damping torque for a generator non-invasively and in real-time based on real-time PMU measurements; (b) reducing or eliminating the need to rely on the complete system models and their complex dynamic simulation, which may be time consuming, computationally intensive, and may suffer from model inaccuracies, computational processing requirements are reduced; (c) centralizing, e.g., at a remote management facility, computation of the dynamic states and damping torque of generators; (d) distributing, e.g., at the individual generator point of intersection substation, computation of the dynamic states and damping torque of generators; and (e) improve tracking of damping torque in real-time on a generator-by-generator basis in an electrical power system, thereby obtaining an improved measurement of system stability in real-time.

Exemplary embodiments of systems and methods for non-invasive generator torque damping estimation are described above in detail. The systems and methods described herein are not limited to the specific embodiments described herein, but rather, components of systems and/or steps of the methods may be utilized independently and separately from other components and/or steps described herein. For example, the methods may also be used in combination with other systems involving analysis of data streams, and are not limited to practice with only the transmissions systems and methods as described herein. Rather, the exemplary embodiments can be implemented and utilized in connection with many other data stream analysis applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stability analysis system for non-invasive estimation of damping torque associated with a power generator in an electric power network, said stability analysis system comprising a processor in communication with a phasor measurement unit (PMU) associated with the power generator, said processor programmed to:
   receive a first data sample set from the PMU, the first data sample set substantially representative of at least one measurement of the power generator;
   determine an estimated torque of the power generator based at least in part on the first data sample set;
   determine an estimated average torque and one or more estimated torque components based at least in part on the estimated torque; and
   dampen torque oscillations of the power generator by regulating excitation of the power generator based on the estimated average torque and the one or more estimated torque components.

2. The stability analysis system in accordance with claim 1, wherein each torque component of the one or more estimated torque components is associated with an oscillatory mode characterized by modal angular frequency.

3. The stability analysis system in accordance with claim 1, wherein determining an estimated average torque and one or more estimated torque components includes estimating the average torque and the one or more estimated torque components using a system identification technique.

4. The stability analysis system in accordance with claim 3, wherein the system identification technique is one of a Kalman filter, particle filters, Luenberger Observers, and adaptive vector quantization (AVQ).

5. The stability analysis system in accordance with claim 3, wherein each torque component of the one or more estimated torque components is associated with an oscillatory mode characterized by modal angular frequency.

6. The stability analysis system in accordance with claim 1, wherein determining an estimated average torque and one or more estimated torque components is further based at least in part on determining values for the estimated average torque at a time, t, $T_{eavg}(t)$, and m estimated torque components in a d-q reference frame, $T_{ed(i)}$ and $T_{eq(i)}$, where i=1 to m, such that the estimated torque at time t, $T_e(t)$, is substantially equal to:

$$T_{eavg}(t) + \Sigma_{i=1}^{m}\{T_{ed(i)}(t)\cos \phi_i(t) - T_{eq(i)}(t)\sin \phi_i(t)\},$$

where $\phi_i(t)=\omega_i t+\phi_{0(i)}$ is the estimated angle, where $\omega_i$ is the estimated speed of the $i^{th}$ modal angular frequency, and $$\varphi_{0(i)} = \tan^{-1}\left(\frac{T_{eq(i)}(t)}{T_{ed(i)}(t)}\right)$$

is the angle at which the estimated space phasor gets locked with its d-q reference frame.

7. The stability analysis system in accordance with claim 1, wherein the first data sample includes a discrete value for a sample of power, $P_s$, at a time, t, wherein the estimated torque is computed as a ratio of the power, $P_s$, to one of an estimated speed and a measured speed, $\omega$, of the power generator.

8. The stability analysis system in accordance with claim 1, wherein said processor is further programmed to:
   initialize a plurality of frequencies associated with the one or more torque components using ambient condition data associated with the power generator; and
   update the plurality of frequencies using a proportional-integral compensator to minimize error between phase angles in consecutive samples.

9. A computer-based method for non-invasive estimation of damping torque associated with a power generator in a power network using a computing device including at least one processor in communication with a phasor measurement unit (PMU) associated with the power generator, said method comprising:
   receiving a first data sample set from the PMU, the first data sample set substantially representative of at least one measurement of the power generator;
   determining an estimated torque of the power generator based at least in part on the first data sample set;
   determining an estimated average torque and one or more estimated torque components based at least in part on the estimated torque; and damping torque oscillations of the power generator by regulating excitation of the power generator based on the estimated average torque and the one or more estimated torque components.

10. The method in accordance with claim 9, wherein each torque component of the one or more estimated torque components is associated with an oscillatory mode characterized by modal angular frequency.

11. The method in accordance with claim 9, wherein determining an estimated average torque and one or more estimated torque components includes estimating the average torque and the one or more estimated torque components using a system identification technique.

12. The method in accordance with claim 11, wherein the system identification technique is one of a Kalman filter, particle filters, Luenberger Observers, and adaptive vector quantization (AVQ).

13. The method in accordance with claim 9, wherein determining an estimated average torque and one or more estimated torque components is further based at least in part on determining values for the estimated average torque at a time, t, $T_{eavg}(t)$, and m estimated torque components in a d–q reference frame, $T_{ed(i)}$ and $T_{eq(i)}$, where i=1 to m, such that the estimated torque at time t, $T_e(t)$, is substantially equal to:

$$T_{eavg}(t) + \Sigma_{i=1}^{m} \{T_{ed(i)}(t)\cos\phi_i(t) - T_{eq(i)}(t)\sin\phi_i(t)\},$$

where $\phi_i(t) = \omega_i t + \phi_{0(i)}$ is the estimated angle, where $\omega_i$ is the estimated speed of the $i^{th}$ modal angular frequency, and $$\varphi_{0(i)} = \tan^{-1}\left(\frac{T_{eq(i)}(t)}{T_{ed(i)}(t)}\right)$$

is the angle at which the estimated space phasor gets locked with its d–q reference frame.

14. The method in accordance with claim 9, wherein the first data sample includes a discrete value for a sample of power, $P_s$, at a time, t, wherein the estimated torque is computed as a ratio of the power, $P_s$, to one of an estimated speed and a measured speed, $\omega$, of the power generator.

15. The method in accordance with claim 9 further comprising:
 initializing a plurality of frequencies associated with the one or more torque components using ambient condition data associated with the power generator; and
 updating the plurality of frequencies using a proportional-integral compensator to minimize error between phase angles in consecutive samples.

16. At least one non-transitory computer-readable storage media having computer-executable instructions embodied thereon, wherein when executed by at least one processor, the computer-executable instructions cause the processor to:
 receive a first data sample set from a phasor measurement unit (PMU) in communication with the processor and associated with a power generator in a power network, the first data sample set substantially representative of at least one measurement of the power generator;
 determine an estimated torque of the power generator based at least in part on the first data sample set;
 determine an estimated average torque and one or more estimated torque components based at least in part on the estimated torque; and
 dampen torque oscillations of the power generator by regulating excitation of the power generator based on the estimated average torque and the one or more estimated torque components.

17. The computer-readable storage media of claim 16, wherein each torque component of the one or more estimated torque components is associated with an oscillatory mode characterized by modal angular frequency.

18. The computer-readable storage media of claim 16, wherein determining an estimated average torque and one or more estimated torque components includes estimating the average torque and the one or more estimated torque components using a system identification technique.

19. The computer-readable storage media of claim 18, wherein the system identification technique is one of a Kalman filter, particle filters, Luenberger Observers, and adaptive vector quantization (AVQ).

20. The computer-readable storage media of claim 16, wherein determining an estimated average torque and one or more estimated torque components is further based at least in part on determining values for the estimated average torque at a time, t, $T_{eavg}(t)$, and m estimated torque components in a d–q reference frame, $T_{ed(i)}$ and $T_{eq(i)}$, where i=1 to m, such that the estimated torque at time t, $T_e(t)$, is substantially equal to:

$$T_{eavg}(t) + \Sigma_{i=1}^{m} \{T_{ed(i)}(t)\cos\phi_i(t) - T_{eq(i)}(t)\sin\phi_i(t)\},$$

where $\phi_i(t) = \omega_i t + \phi_{0(i)}$ is the estimated angle, where $\omega_i$ is the estimated speed of the $i^{th}$ modal angular frequency, and $$\varphi_{0(i)} = \tan^{-1}\left(\frac{T_{eq(i)}(t)}{T_{ed(i)}(t)}\right)$$

is the angle at which the estimated space phasor gets locked with its d–q reference frame.

21. The computer-readable storage media of claim 16, wherein the first data sample includes a discrete value for a sample of power, $P_s$, at a time, t, wherein the estimated torque is computed as a ratio of the power, $P_s$, to one of an estimated speed and a measured speed, $\omega$, of the power generator.

* * * * *